United States Patent [19]
Newton et al.

[11] Patent Number: 5,803,124
[45] Date of Patent: Sep. 8, 1998

[54] RAIL VEHICLE BRAKE MANIFOLD

[75] Inventors: Ronald O. Newton, Adams; D. Mark Pettit, LaFargeville, both of N.Y.

[73] Assignee: New York Air Brake Corporation, Watertown, N.Y.

[21] Appl. No.: 777,204

[22] Filed: Dec. 27, 1996

[51] Int. Cl.⁶ ...................................................... F16K 1/00
[52] U.S. Cl. ................................................................ 137/884
[58] Field of Search ..................................... 137/269, 270, 137/884

[56] References Cited

U.S. PATENT DOCUMENTS 4,449,426 5/1984 Younger ................................ 137/884 X
4,951,709 8/1990 Kirkham ............................... 137/269 X

*Primary Examiner*—Kevin Lee
*Attorney, Agent, or Firm*—Barnes & Thornburg

[57] ABSTRACT

A manifold having a first and second plate, each having an interior face with one or more chambers and passages thereon and an exterior face with ports connected to the chambers and passages and having a center plate having first and second faces abutting the interior faces of the first and second plates respectfully and having apertures extending between the first and second faces and aligned with chambers on the interior faces. Pneumatic devices, sources of pneumatic fluid and pneumatic circuits are to be connected to the ports on the exterior faces.

20 Claims, 5 Drawing Sheets

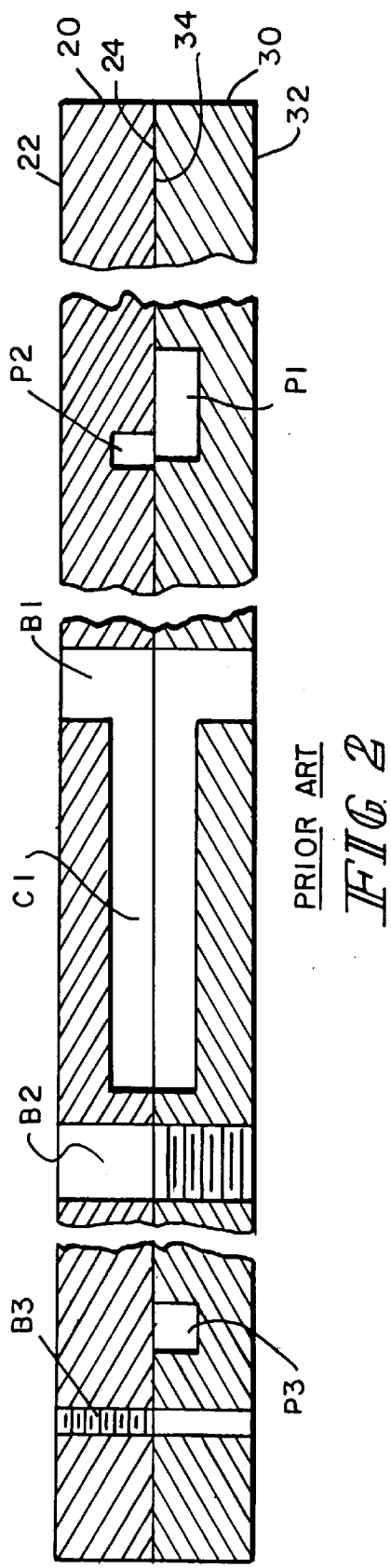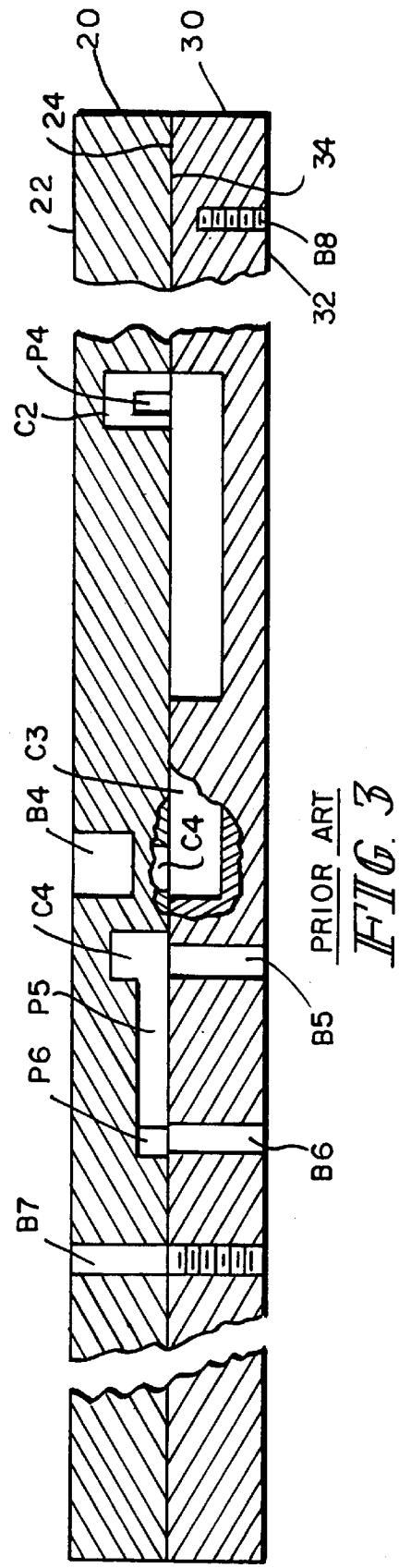

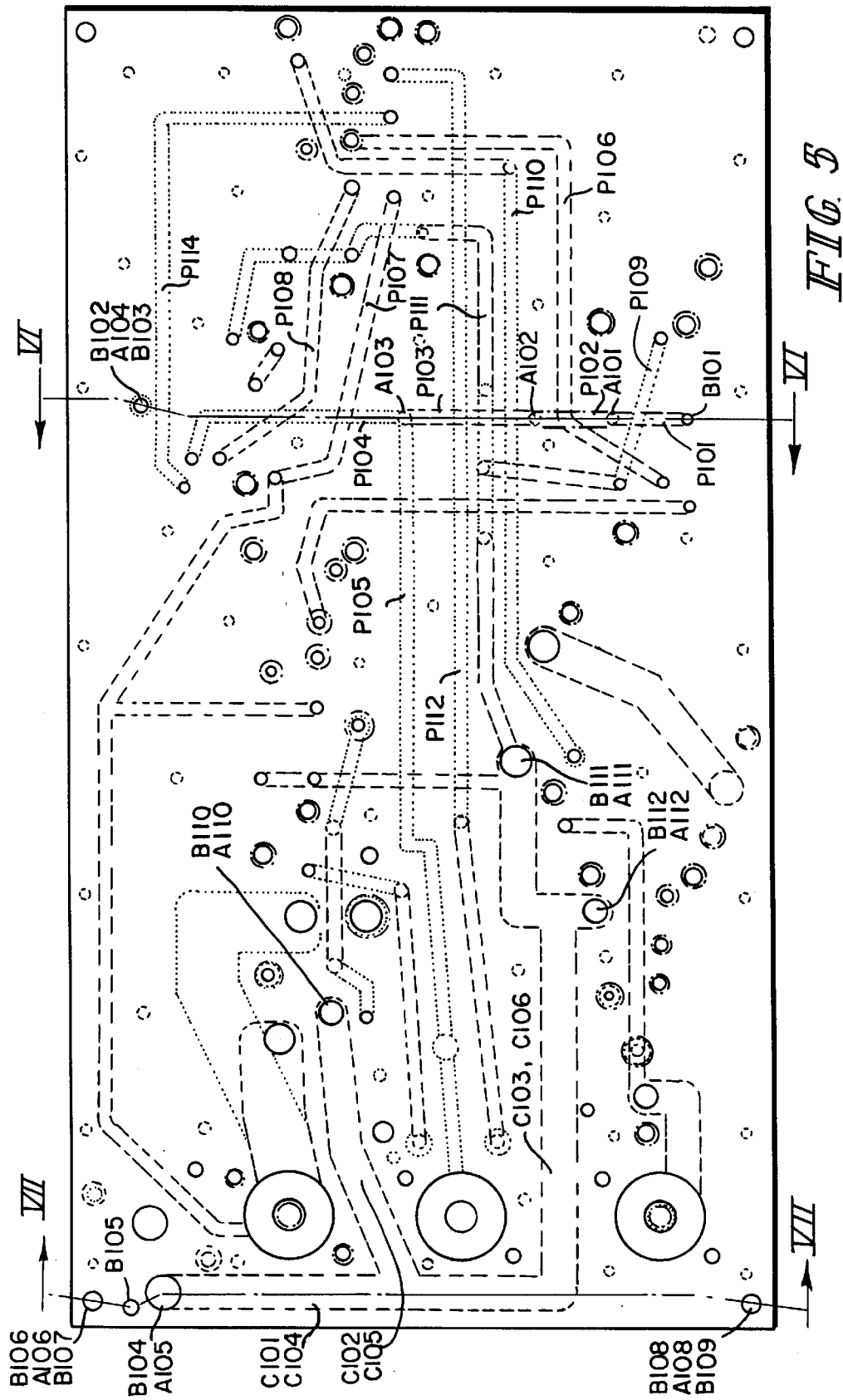

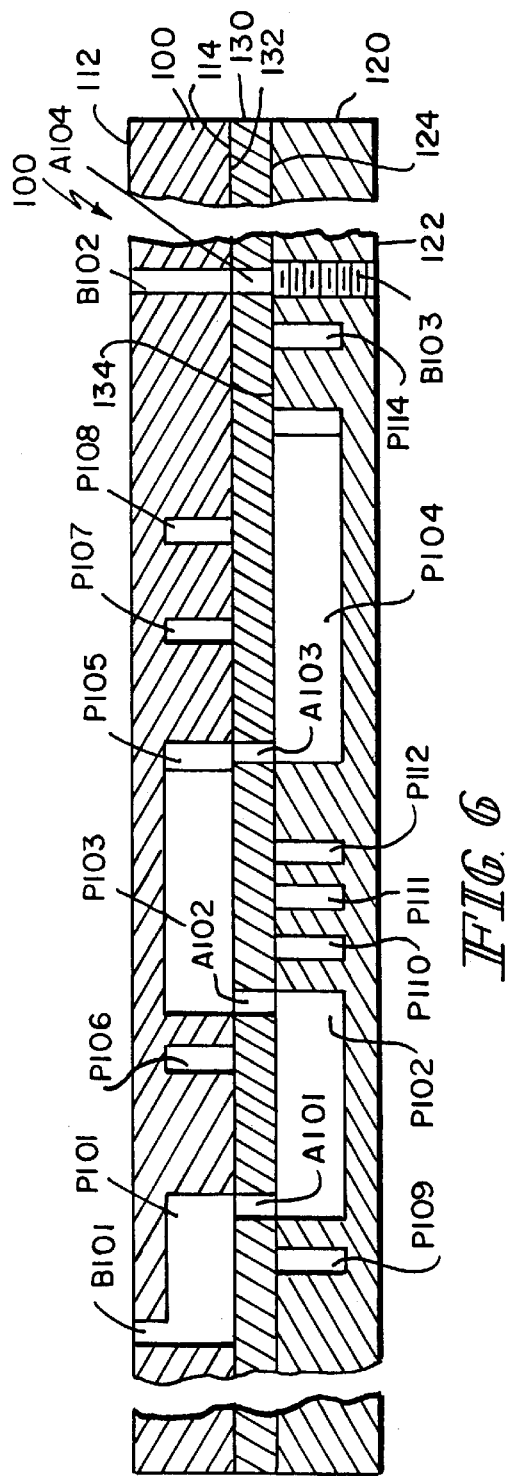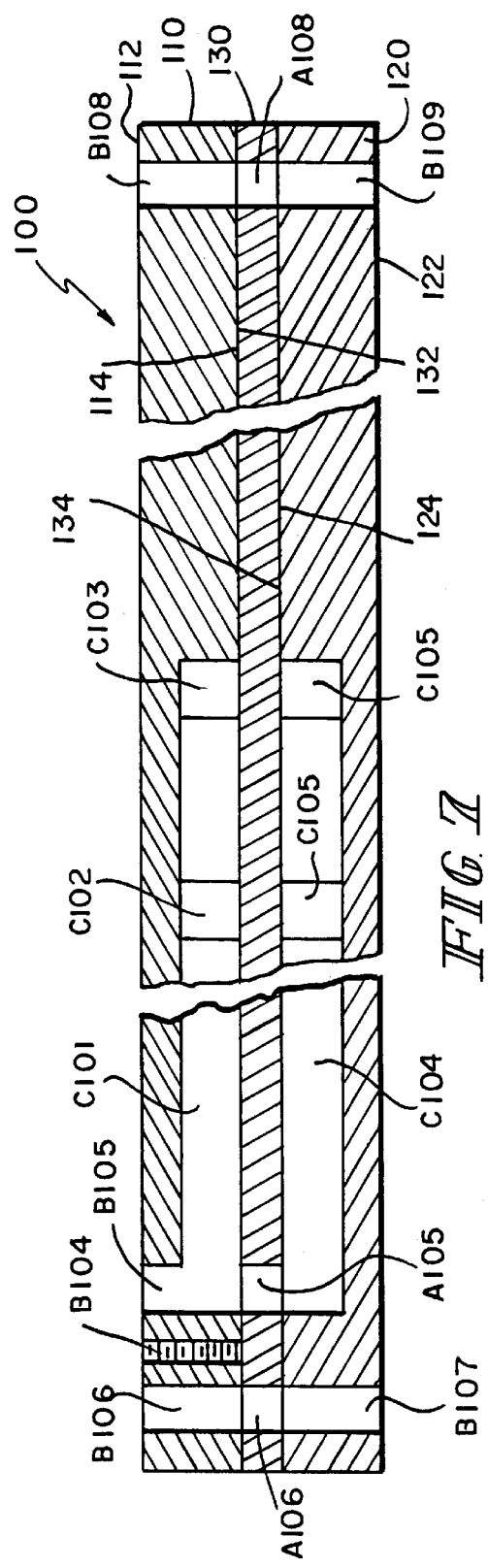

RAIL VEHICLE BRAKE MANIFOLD

BACKGROUND AND SUMMARY OF THE INVENTION

The present invention relates generally to pneumatic manifolds and more specifically to pneumatic manifold for rail vehicle brakes.

Manifolds for rail vehicle brakes include a plurality of faces having ports for connection to pneumatic devices, sources of pneumatic fluid and pneumatic circuits connected to the faces. In some cases, pneumatic devices are mounted on the face and in other cases, the pneumatic device, sources of pneumatic fluid and pneumatic circuits are connected to the device by hoses or other couplings. The manifold is mounted to the rail vehicle. The rail vehicle may include locomotives or cars including freight, passenger and mass transit.

One example of a prior art manifold, used for example in a freight locomotive known as CCB from New York Air Brake Corporation, is illustrated in FIGS. 1–3. The manifold includes two plates having the interior faces machine to provide passages and chambers and the exterior faces machine to have bores for connecting the passages and chambers to ports on the exterior faces. The passages are generally shallower than the chambers. Adhesives are applied to the interior faces to bond the two plates together. The adhesives sometimes would extend into the shallow passages and block them. These manifolds had to be scrapped. Also, securitous path had to be selected for the connection of the ports on either a common face or the opposite exterior faces. This limited the placement of the ports on the exterior faces of the manifold. This is particularly detrimental where the pneumatic devices are mounted on one of the faces instead of just mere connection to external or non-mounted pneumatic device.

For the prior art structure of FIGS. 1–3, the two core plates, for example, are ¾ of an inch. This allowed a chamber depth of ½ inch into each plate for a combined depth of one inch chambers. If a bypass was needed because of the layout, a ¼ inch cover plate would be provided as a bypass plate on one of the exterior faces.

The prior art manifold to FIGS. 1–3 was an improvement over a previous prior art manifold illustrated in FIG. 4. This included a center core plate with a pair of cover plates. The core plate was machined to include the chambers and passages and the cover plates provided connection to external ports. The cover plates were substantially thinner than the core plate. Typically, the core plate was one inch and the cover plate was ½ inch. The one-inch core plate limited the depths of the chambers to ¾ of an inch.

The present manifold overcomes the problems of the prior art manifolds by providing a first and second plate, each having an interior face with one or more chambers and passages thereon and an exterior face with ports connected to the chambers and passages and a center plate having first and second faces abutting the interior faces of the first and second plates respectfully and having apertures extending between the first and second faces and aligned with chambers on the interior faces. Pneumatic devices, sources of pneumatic fluid and pneumatic circuits are to be connected to the ports on the exterior faces. Preferably, the ports, chambers and passages are machined in the first and second plates, and the apertures are stamped in the center plate. While the first and second plate have substantially the same thickness, the center plate has a thickness substantially less than the thickness of either the first or second plate. The chambers extend from an interior face and terminate short of the exterior face and include bores connecting the chambers to the ports on the exterior faces.

The center plate covers the chambers and passages at the interior faces and selectively connects opposed chambers and passages at the interior faces by apertures in the center plate. Thus, the center plate fluidically isolates the chambers or passages of the first and second plates which cross over each other except where selectively connected by the apertures in the center plate. The first and second plates are bonded to the center plate. The chambers and passages have substantially the same depth and the depth of the chambers and passages is more than ½ the thickness of the first or second plate.

Other objects, advantages and novel features of the present invention will become apparent from the following detailed description of the invention when considered in conjunction with the accompanying drawings.

BRIEF DESCRIPTION OF THE DRAWINGS

FIG. 2 is a cross-sectional view taken along lines II—II of FIG. 1.

FIG. 3 is a cross-sectional view taken along lines III—III of FIG. 1.

FIG. 5 is a transparent view of the chambers, passages, ports, apertures and bores of a manifold including two cores separated by a center plate according to the principles of the present invention.

FIG. 6 is a cross-sectional view taken along lines VI—VI of FIG. 5.

FIG. 7 is a cross-sectional view taken along lines VII—VII of FIG. 5.

DETAILED DESCRIPTION OF THE PREFERRED EMBODIMENTS

Figure 1:
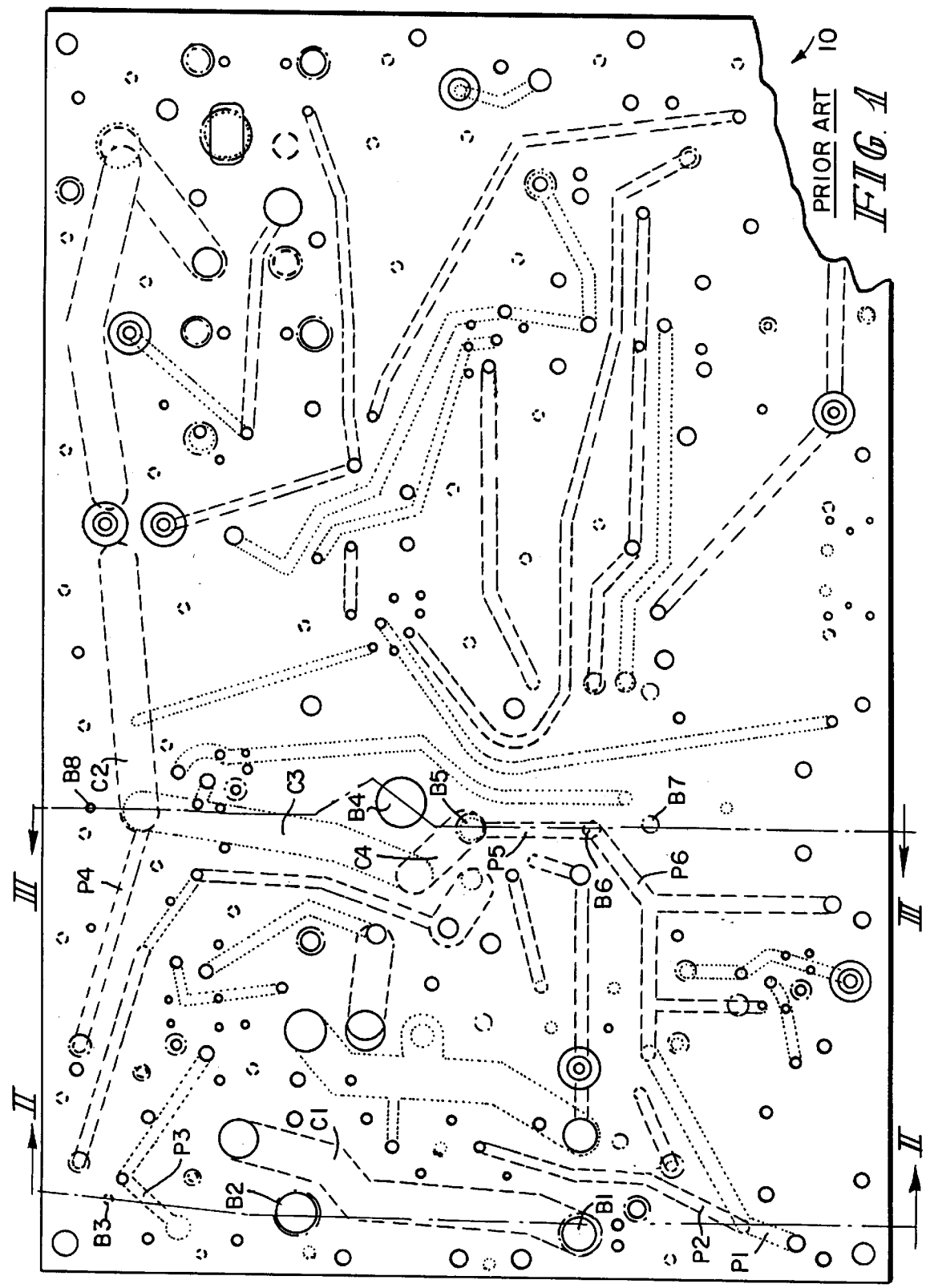
FIG. 1 is a transparent overlay of the passages, chambers and ports of a double core manifold of the prior art.

A prior art manifold 10 is illustrated in FIG. 1–3. A front plate 20 has an exterior face 22 and an interior face 24. A rear plate 30 includes an exterior face 32 and an interior face 34. The appropriate chambers C, passages P and bores B are machined in the interior faces 24 and 34 and the exterior faces 22 and 32. The two plates are then joined at the interior faces 24 and 34 by glue which, when cured, bonds the two plates together.

Referring first to FIGS. 1 and 2, the chamber C1 extends from the joined interior faces 24 and 34 into each plate to form a common chamber. A bore B1 extending through both plates 20 and 30 provide ports on the exterior faces 22 and 32. Passage P1 in the rear plate 30 is connected to passage P2 in the front plate 20 by their overlap. Passage P3 in the rear plate 30 is not connected to any passage or chamber in plate 20 but is connected through appropriate bores, not shown in cross section of FIG. 2 to ports on the exterior faces 22 and 32. Through bores B2 and B3 do not intersect any of the passages or chambers and are used to mount pneumatic devices, fluid sources or fluid circuits to the manifold. Bore B3 is threaded in plate 20 and B2 includes threaded portion in plate 30. With respect to cross sections of FIG. 3, chamber C3 in the rear plate 30 is connected to chamber C2 in the front plate 20 at an overlap. Passage P4 is connected to chamber C2. Chamber C4 in the front plate 20 is connected to chamber C3 in the rear plate 30 at a point of overlap shown cut away. Passage P5 is connected to chamber C4 and passage P6 is connected to passage P5. Bores B5 and B6 connect ports on the exterior face 32 of plate 30 to chamber C4 and passages P5 and P6. A bore B4 is provided in the surface 22 of plate 20. Bore B7 extends through plates 20 and 30 and has a threaded section in plate 30. A threaded bore B8 is in face 32 of plate 30.

As will be noted from review of FIG. 2 and 3, the chambers C have a substantially greater depth than the passages P. Using for example, plates 20 and 30 having a thickness of ¾ of an inch, the chamber depth is approximately ½ an inch and the passage depth is approximately ¼ inch. When glue is applied to interior surfaces 24 and 34 and later cured, the glue sometimes would extend into the passages P and clog them. Review of FIG. 1 will show a circuitous or snake-like path of the various passages P to provide the appropriate interconnection of the ports on the exterior faces. Since the passages are provided on the interior faces 24 and 34, the passages could not pass over each other or chambers to which they are not to be connected. This limits the layout of the ports and the pneumatic devices which are mounted to the manifold 10.

Figure 4:
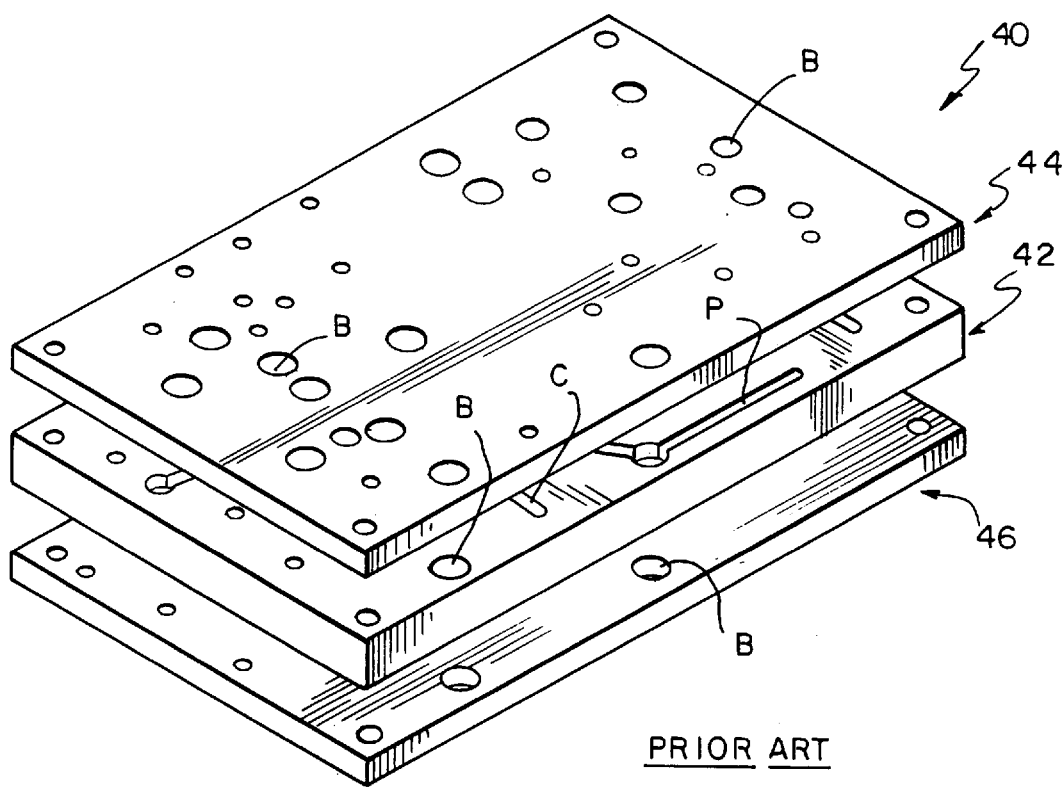
FIG. 4 is an exploded perspective of a single core with double cover plates manifold of the prior art.

A predecessor of the manifold of FIGS. 1–3 is manifold 40 illustrated in FIG. 4. It includes a center core plate 42 having a plurality of chambers C and passages P therein and cover plates 44 and 46 having a plurality of ports and bores connecting the passages and chambers to the external ports. The chamber C, the passage P and the bores B are all machined in the center core 42 and the cover plates 44 and 46. For example, the center core 42 would have a thickness of one inch with each of the cover plates 44 and 46 having a thickness of approximately ½ inch. The chambers would have a thickness of approximately ¾ of an inch and the passages would have a thickness of approximately ¼ of an inch. Thus, the passages cannot cross over any chamber to which it should not be connected although passages could cross over each other.

An improved manifold for railroad vehicle brakes is illustrated in FIGS. 5–7. In comparing the manifold of FIG. 1 of the prior art and FIG. 5, it is evident that the passages P do not extend in circuitous paths but continuously cross over each other without limitation. This allows greater flexibility and design of location of ports and elements on the manifold since the interconnection of the ports by the passages is not limited. For sake of comparison, the manifold 100 of FIG. 5 is a locomotive brake manifold to be compared against locomotive manifold 10 of FIG. 1.

Referring to FIGS. 5 and 6, the manifold 100 includes a front plate 110, having an exterior face 112 and an interior face 114 and a rear plate 120 having an exterior face 122 and an interior face 124. A center plate 130 having faces 132 and 134 which are bonded to interior faces 114 of plate 110 and 124 of plate 120. While the front and rear plate 110 and 120 includes bores B, passages P and chambers C, the center plate 130 includes apertures A which selectively connect bores B, passages P and chambers C on the adjacent interior faces 114 and 124 of the plates 110 or 120.

Bore B 101 connects a port on exterior surface of plate 110 to passage P101. Passage P102 in rear plate 120 is connected to passage P101 by aperture A101 and passage P103 in plate 110 by aperture A102. Passage P104 in rear plate 120 is connected to passage P103 by aperture A103 in the center plate 130. Passage P105 in plate 110 is connected to passage P103. Passages P106, P107 and P108 in plate 110 cross over passages P102 and P104 in plate 120 and are separated therefrom by center plate 130. Similarly, passages P109, P110, P111 and P112 in the rear plate P120 pass over passages P101 and P103 in front plate 110 and are pneumatically isolated thereby therefrom by center plate 130. Rear plate 120 also includes passage P114. Bore B102 in plate 110 and aperture A104 in plate 130 are coaxial with threaded bore B103 in plate 120.

In FIGS. 5 and 6, it can be seen that by the use of the center plate 130, the passages P101–P104 run in a substantially straight line along the width of the plates alternating between the front plate 110 and the rear plate 120 and allowing a substantial number of passages to cross thereover. The center plate 130 forms a cover for the passages and selectively interconnects the passages by apertures A.

Referring to FIGS. 5 and 7, chambers C101, C102 and C103 in the front plate 110 are coextensive and juxtapose chambers C104, C105 and C106 in the rear plate 120. A bore 105 in front plate 110 connects the chamber C101 to a port on exterior face 112 and aperture A105 connects chambers C101 and C104. As shown in FIG. 5, bore B110 and aperture A110 connect a port on face 112 to chambers 102 and connects chamber C102 to chamber C105. Similarly, bore B111/aperture A111 and bore B112/aperture A112 connect passage C103 to ports on exterior surface 112 and chamber C103 to chamber C106. As distinguished from the coextensive chamber C1 of FIG. 2 of the prior art, the coextensive chambers C101–C106 are only connected at appropriate points by apertures in the center plate. All of the chambers will have the same volume as that in the prior art with the exception of addition of the volume of the apertures A. Using the center plate 130, the chamber portions do not have to be limited to being juxtapose, even though they are so illustrated.

A threaded bore B104 is provided in the front plate 110. Through bores including B106, A016, B107 and B108, A108 and B109 are provided in the three plates to receive fasteners for mounting the manifold 100 to an appropriate bracket.

Comparing the passages P in FIG. 6 to the chamber C in FIG. 7, it will be noted that they are the same depth. Since the chambers are generally wider than the passages, they are not deteriously affected by glue or the bonding agent extending into the chambers. By making the passages P the same depth as the chamber C, any bonding agent which accidentally gets in the passages P, would not restrict the passage. As a typical example, the front and rear plates 110 and 120 are approximately ¾ of an inch thick with the center plate 130 being between ¹⁄₁₆ to ¼ of an inch. The depth of the passages P and the chamber C are approximately ½ inch.

The bores B, the passages P and the chambers C are machined in the front and rear plates 110 and 120. Preferably, the apertures A are stamped into the center plate 130. This will substantially reduce the cost of manufacture of the center plate 130. Since the center plate 130 is subject to very little, if any structural stress since this does not support any of the mounting fasteners, it can be as thin as possible consistent with fluidic isolation.

The method of assembly would include applying adhesives to interface 114 of the front plate 110 and positioning center plate 130 thereon with the apertures aligned with the appropriate passages and chambers. Next adhesive would be put on interior face 124 of the rear plate 120 and it would be positioned on center plate 130. The combined structure would then be clamped and the adhesive cured. If cured at room temperature, the curing would take 24 hours. Alternatively, the manifold 100 can be placed in 300° F. oven for four hours. By applying the adhesives to the interior faces 114 of plate 110 and 124 of plate 120, minimizes the amount of adhesive which would possibly lie in the passages, ports and chambers. Preferably, a silk screening process is used to apply the adhesive. The order of applying the plates to each other is not critical.

Although the present invention has been described and illustrated in detail, it is to be clearly understood that the same is by way of illustration and example only, and is not to be taken by way of limitation. Although a locomotive brake manifold has been used by way of example, the present invention is applicable to any manifold requiring a substantial number of connections and interconnections of ports on different faces of the manifold. The spirit and scope of the present invention are to be limited only by the terms of the appended claims.

What is claimed:

1. A manifold for rail vehicle brakes having ports for one or more of pneumatic devices, sources of pneumatic fluid and pneumatic circuits to be connected to said manifold comprising:
    a first plate having an interior face with one or more of chambers and passages thereon and having an exterior face with at least one port connected to at least one of said chambers and passages;
    a second plate having an interior face with one or more of chambers and passages thereon and having an exterior face with at least one port connected to at least one of said chambers and passages; and
    a center plate having first and second faces abutting said interior faces of said first and second plate respectively and having at least one aperture extending between said first and second faces and aligned with said chambers or passages on said interior faces.

2. A manifold according to claim 1, wherein said ports, chambers and passages are machined in said first and second plates.

3. A manifold according to claim 1, wherein said at least one aperture is stamped in said center plate.

4. A manifold according to claim 1, wherein said first and second plates have substantially the same thickness and said center plate has a thickness substantially less than the thickness of either said first or second plate.

5. A manifold according to claim 1, wherein said chambers extend from said interior face and terminate short of said exterior face and including bores connecting said chambers to ports on said exterior face.

6. A manifold according to claim 1, wherein said center plate covers said chambers and passages at said interior faces and selectively connects said opposed chambers and passages at interior faces by said at least one aperture in said center plate.

7. A manifold according to claim 6, wherein said center plate fluidicly isolates chambers or passages of said first and second plates which crossover each other except where selectively connected by said at least one aperture in said center plate.

8. A manifold according to claim 1, wherein said first and second plates are bonded to said center plate.

9. A manifold according to claim 1, wherein said chambers and passages have substantially the same depth.

10. A manifold according to claim 9, wherein said depth of said chambers and passages is more than one half the thickness of said first or second plates.

11. A method of making a manifold for rail vehicle brakes having ports for one or more of pneumatic devices, sources of pneumatic fluid and pneumatic circuits to be connected to said manifold, the method comprising:
    forming a first plate having an interior face with one or more of chambers and passages thereon and having an exterior face with at least one port connected to said chambers and passages;
    forming a second plate having an interior face with one or more of chambers and passages thereon and having an exterior face with at least one port connected to said chambers and passages;
    forming a center plate having first and second faces and at least one aperture extending between said first and second faces; and
    mounting said first and second plates to said center plate with said interior faces of said first and second plates abutting said first and second faces respectively and the at least one aperture of the center plate connecting opposed chambers and passages on said interior faces.

12. A method according to claim 11, wherein forming said first and second plates includes machining said ports, chambers and passages in said first and second plates.

13. A method according to claim 11, wherein forming said center plate includes stamping said at least one aperture in said center plate.

14. A method according to claim 11, wherein said first and second plates have substantially the same thickness and said center plate has a thickness substantially less than the thickness of either said first or second plate.

15. A method according to claim 11, wherein said chambers are formed to extend from said interior face and terminate short of said exterior face and including forming bores connecting said chambers to ports on said exterior face.

16. A method according to claim 11, wherein said center plate covers said chambers and passages at said interior faces and selectively connects said opposed chambers and passages at interior faces by said at least one aperture in said center plate.

17. A method according to claim 16, wherein said center plate fluidicly isolates chambers or passages of said first and second plates which crossover each other except where selectively connected by said at least one aperture in said center plate.

18. A method according to claim 11, wherein said mounting includes bonding said first and second plates to said center plate.

19. A method according to claim 11, wherein said chambers and passages are formed to have substantially the same depth.

20. A method according to claim 19, wherein said depth of said chambers and passages is more than one half the thickness of said first or second plates.

* * * * *